(12) United States Patent
Miller et al.

(10) Patent No.: US 6,584,671 B2
(45) Date of Patent: *Jul. 1, 2003

(54) PROCESS FOR PRODUCING AN ELECTROMAGNETIC SUBASSEMBLY FOR A MAGNETIC LEVITATION RAILWAY

(75) Inventors: Luitpold Miller, Ottobrunn (DE); Wolfgang Hahn, Kassel (DE)

(73) Assignee: Thyssen Transrapid System GmbH, Kassel (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/125,092
(22) PCT Filed: Feb. 8, 1997
(86) PCT No.: PCT/DE97/00294
§ 371 (c)(1),
(2), (4) Date: May 6, 1999
(87) PCT Pub. No.: WO97/30505
PCT Pub. Date: Aug. 21, 1997

(65) Prior Publication Data
US 2001/0002507 A1 Jun. 7, 2001

(30) Foreign Application Priority Data
Feb. 12, 1996 (CH) .............................................. 0359/96
Jan. 31, 1997 (DE) .......................................... 197 03 497

(51) Int. Cl.[7] .............................. H02K 15/10; C09J 5/04
(52) U.S. Cl. ............................. 29/596; 29/609; 29/598; 264/272.19; 264/272.2; 264/261; 156/305; 156/330

(58) Field of Search .......................... 29/596, 598, 609; 310/42, 43; 264/272.19, 272.2, 261; 156/305, 330

(56) References Cited
U.S. PATENT DOCUMENTS
3,304,358 A * 2/1967 De Jean et al. ................ 29/609
(List continued on next page.)

FOREIGN PATENT DOCUMENTS
DE        25 58 893       7/1977
(List continued on next page.)

OTHER PUBLICATIONS
"Verfahren Und Anlagen Zum Vergiessen . . ." By A. Rost, In Kunststoff–Rundschau—Heft 3, Mar. 1968, pp. 106–113.
Kunststoff–Lexicon, Hrg. Dr.–Ing K. Stoeckhart and Prof. Dr.–Ing. W. Woebcken, Carl Hansen Verlag, BRD, 8th Edition, 1992.
Becker/Braun Kunststoff–Handbuch, vol. 10, Duroplaste, Carl Hansen Verlag 1988.

Primary Examiner—A. Dexter Tugbang
(74) Attorney, Agent, or Firm—Michael J. Striker

(57) ABSTRACT

The method provides an electromagnetic assembly in the form of a magnet pole or of a stator packet of an extended stator linear motor for a magnetic levitation train. The assembly includes a sheet stack (8) made of ferromagnetic material and at least one additional component (12,13,14). The sheet stack (8) is assembled from raw magnetic steel sheets and is positioned in a shaping tool. Thereafter by feeding a hardenable mixture into the tool and hardening or hardening out the mixture, the sheets are surrounded with the mixture and connected to each other in a single working step to form the finished sheet stack. In the same working step, the sheet stack (8) is connected to the additional component (12,13,14) and the assembly as a whole is provided with its final electrical, magnetic, mechanical and/or geometric properties.

3 Claims, 9 Drawing Sheets

U.S. PATENT DOCUMENTS

| | | | | |
|---|---|---|---|---|
| 3,533,867 A | * | 10/1970 | Van Derzee | 29/609 |
| 3,631,590 A | * | 1/1972 | Wichmann et al. | 264/272.2 |
| 3,813,763 A | * | 6/1974 | Church | 29/596 |
| 4,510,421 A | | 4/1985 | Schwarzler | |
| 5,088,186 A | * | 2/1992 | Boesel | 29/605 |
| 5,176,946 A | * | 1/1993 | Wieloch | 428/138 |
| 5,317,300 A | * | 5/1994 | Boesel | 336/96 |
| 5,926,946 A | * | 7/1999 | Minato et al. | 29/606 |

FOREIGN PATENT DOCUMENTS

| | | |
|---|---|---|
| DE | 31 10 339 C2 | 9/1984 |
| DE | 34 10 119 A1 | 10/1985 |
| DE | 33 03 961 C2 | 12/1989 |
| DE | 39 28 277 C1 | 12/1990 |
| DE | 41 01 190 A1 | 8/1991 |
| WO | WO 96/16100 | 5/1996 |
| WO | WO 96/20235 | 7/1996 |

* cited by examiner

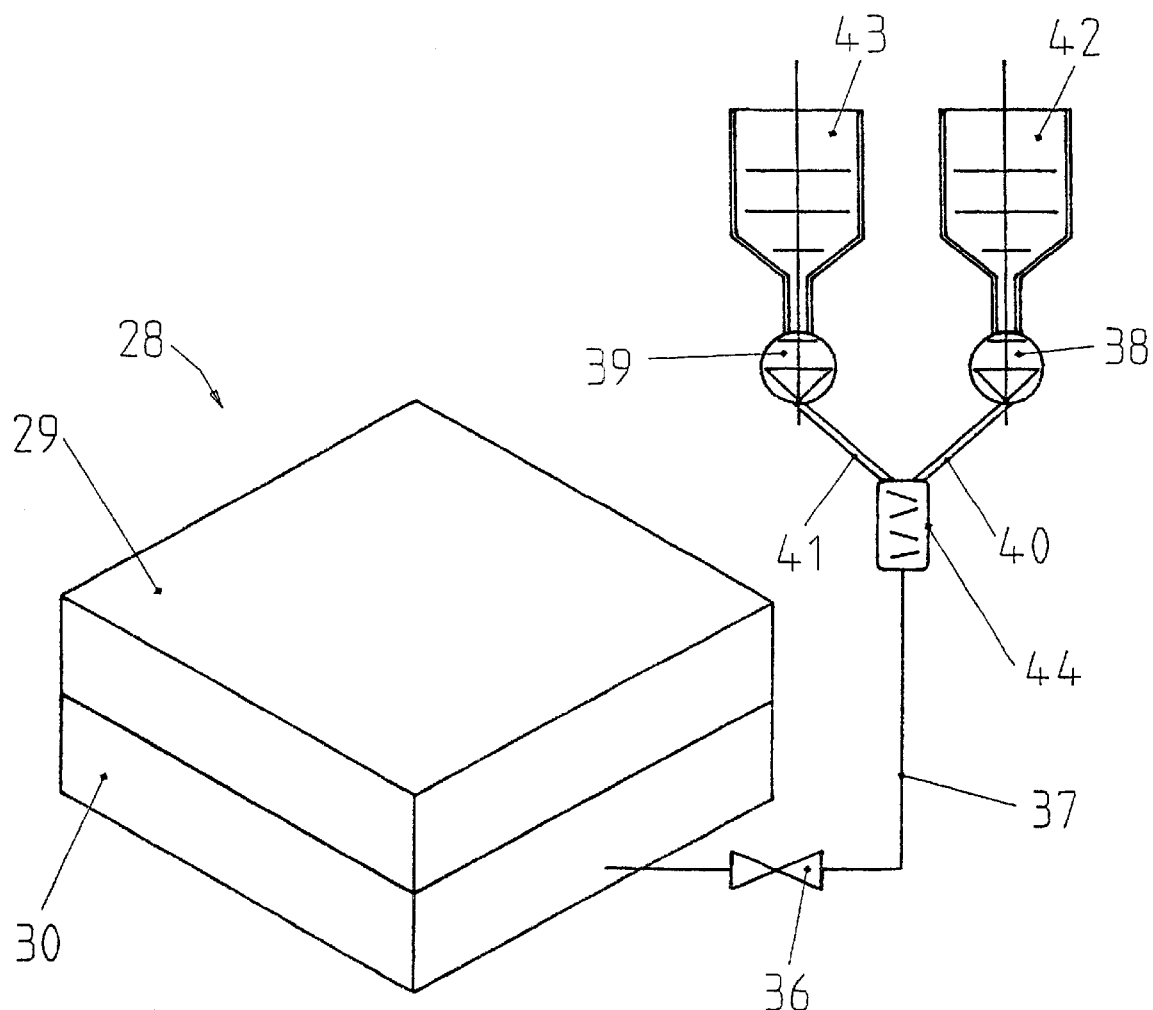
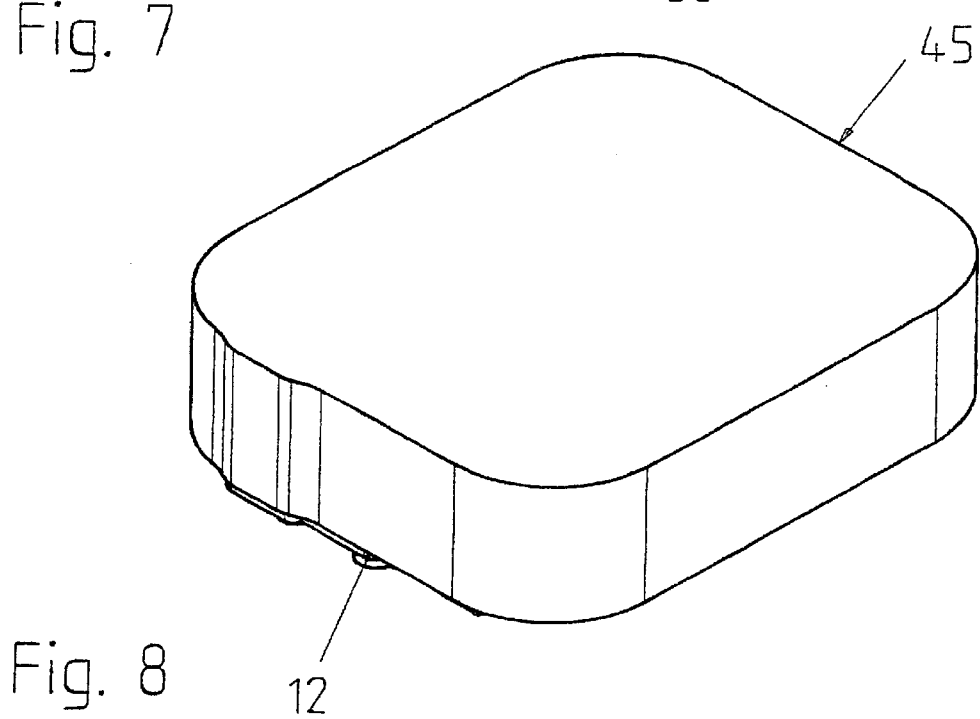

PROCESS FOR PRODUCING AN ELECTROMAGNETIC SUBASSEMBLY FOR A MAGNETIC LEVITATION RAILWAY

BACKGROUND OF THE INVENTION

1. Field of the Invention

The present invention relates to a method of making an electromagnetic assembly comprising at least one sheet stack made of ferromagnetic material and at least one additional component in the form of a magnet pole or stator packet of a stator linear motor for a magnetic levitation train and to the electromagnetic assembly produced by that method.

2. Prior Art

In a known method of this type (DE 31 10 339 C2) for manufacturing stator packets, firstly strips made from silicated magnetic steel sheets are provided preferably on both sides with additional adhesive layers, which consist for example of a pre-hardened duroplastic adhesive and if necessary are already applied in the rolling mill in a complex, expensive working step. The manufacture of sheet stacks is then carried out in that sheet blanks or lamellae are stamped out from such sheet strips drawn off from coils (drums), and these are then combined into stacks and thereafter, by heating and simultaneous pressure, are mechanically securely connected together to form a sheet stack. Then the finished sheet stacks are additionally provided with a coating of an epoxy resin or the like, in order to provide the cut edges of the plates revealed during stamping with an additional anti-corrosion layer. Finally the individual sheet stacks are connected by gluing, screwing, clamping or the like to other components, in particular to crosspieces intended for their attachment on a travel path, forming the finished stator packet. In order to obtain sufficient mechanical stability as a rule disadvantages from the electromagnetic stand point must be accepted, e.g. with respect to the electromagnetically unfavorable cross-sectional shapes of the groove which are however desirable for attachment of the electrical conductors.

Magnet poles for long stator linear motors are produced in a similar way, finished sheet stacks then being provided with windings and pole jaws or the like, and connected. In this case also compromises must be accepted between mechanical stability and electromagnetic properties, e.g. with respect to the geometry of the iron core made out of the sheet stack, which is necessary for reliable assembly of the windings, and yet entails undesirable magnetic dispersion effects.

Due to the installations required for coating the strips of magnetic steel sheet, methods of this type involve high investment costs. A further disadvantage is that the waste occurring during stamping is provided with an adhesive layer, which ought to be avoided for reasons of environmental protection, and which prevents properly-classified recycling of the sheet steel waste. Finally, the known method requires numerous successive partial steps, which respectively serve a pre-selected partial purpose.

SUMMARY OF THE INVENTION

The object underlying the invention is therefore to alter the above described method for manufacturing magnet poles and stator packets in such a way that lower investment costs and fewer individual steps are required and better adaptation is possible to the functions of the various components involved. Moreover, high mechanical strength and high resistance to external weathering influences are to be achieved.

The method according to the invention provides an electromagnetic assembly in the form of a magnet pole or stator packet of an extended stator linear motor for a magnetic levitation train, which includes at least one sheet stack made of ferromagnetic material and at least one additional component. This method comprises the steps of:

a) assembling the at least one sheet stack from a plurality of raw magnetic steel sheets;

b) positioning the at least one sheet stack together with the at least one additional component, if necessary using auxiliary positioning means, in a tool; and then c) feeding a hardenable mixture into the tool and hardening or hardening out of the hardenable mixture according to a pressure-gelling method in one single working step so that the steel sheets are connected together to form a finished sheet stack surrounded by the hardenable mixture and the finished sheet stack is connected to the at least one additional component to form the electromagnetic assembly with final electrical, magnetic, mechanical and/or geometric properties.

Further advantageous features of the invention will become apparent from the dependent claims.

BRIEF DESCRIPTION OF THE DRAWING

The invention will be explained in more detail in the following with reference to two embodiments given by way of example, which are shown in the accompanying drawing on slightly differing scales, in which

FIG. 7 is a schematic view of the insertion of a hardenable mixture into the tool according to FIGS. 5 and 6;

FIG. 8 is a perspective view of the completed magnet pole;

DESCRIPTION OF THE PERFERRED EMBODIMENTS

The invention will be explained in more detail in the following with reference to the examples of a magnet pole and of a stator packet for a magnetic levitation train with a long stator linear motor, whose structure, function and geometry are well known to the person skilled in the art. For reasons of simplicity in this respect, reference is made for example to DE 31 10 339 C2, DE 33 03 961 C2, DE 34 10 119 A1 and DE 39 28 277 C1, and the contents of these documents are thus, as far as necessary, made the subject-matter of the present disclosure.

In a known way, a magnet pole includes an iron core consisting of a sheet stack, and a winding applied thereto. According to FIGS. 1 to 8 the iron core consists of a plurality of individual sheets or lamellae 1, arranged in parallel and aligned flush on one another, which have been obtained for example by stamping out from a ferromagnetic magnetic sheet strip, which has been unwound from a drum (coil), and passed to a stamping tool. According to the invention, a raw magnetic steel sheet strip is involved. In this respect the term "raw" is understood to mean that the magnetic steel sheet strip, contrary for example to DE 31 10 339 C2, has no adhesive layer applied in a separate working procedure. On the contrary, the sheet strip, as is conventional with magnetic steel sheets, can be provided with an electrically insulating layer by means of a lacquer coating an oxide layer or other means which may be applied in a cost-effective manner on both sides. This layer can already be applied in the rolling mill to the sheet strip, and in the case of magnetic steel sheets conventional today usually consists of an extremely thin silica phosphate layer, which is produced as the magnetic steel sheets are rolled out. For the purposes of the invention this layer is comparatively irrelevant, as under certain circumstances it can also be totally omitted.

Figure 1:
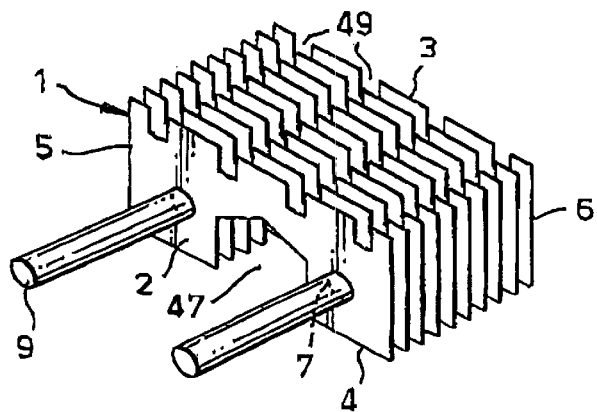
FIG. 1 is a perspective, exploded view of some plates of a sheet stack for a magnet core according to the invention.

The individual sheets 1, of which only a few are shown in FIG. 1, in the embodiment have a thickness of for example 0.35 to 1.00 mm, and have identical dimensions, and each have a forward or rear wide side 2, and in the respective circumferential directions, a narrow upper side 3, a lower side 4 and two side edges 5 and 6. In addition, they are each provided during the stamping procedure at identical points with at least one hole 7 and in order to form the iron core after the stamping procedure into packets 8 (FIG. 2), are stacked, being laid on one another with their forward or rear wide sides 2 flush and parallel with one another. The number of sheets 1 per packet 8 depends on the size and thickness of the magnetic pole to be produced. The mutual alignment of the sheets 1 is carried out appropriately with the aid of slide blocks or rods 9, upon which the sheets 1 are threaded with their holes 7. In the stacked sheet packet 8, the upper sides 3 of the individual sheets 1 form a magnet pole surface 10, while the undersides 4 form an assembly surface 11.

Figure 2:
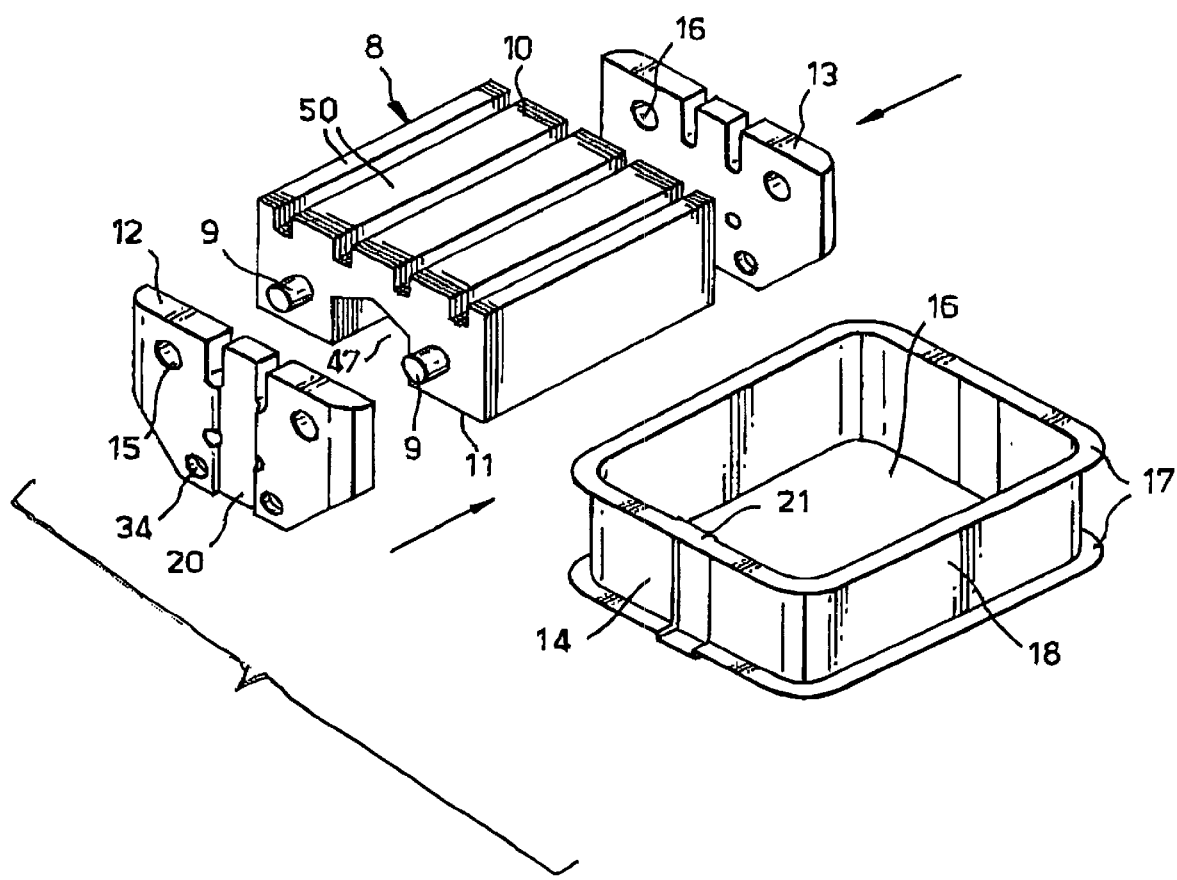
FIG. 2 is a perspective view of the components used to produce a complete magnet core, with the sheet stack in the stacked condition.
Figure 3:
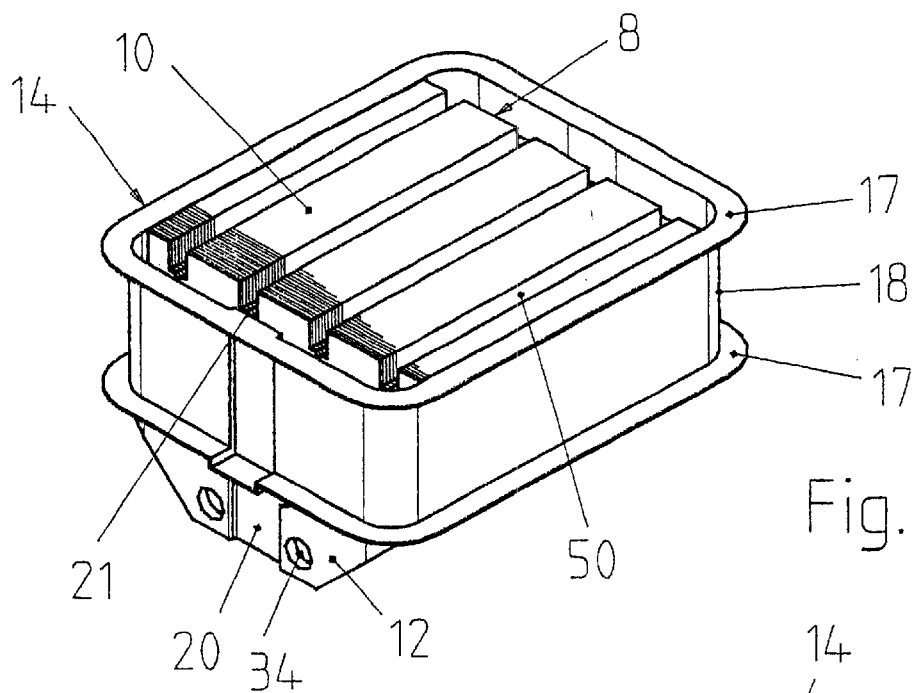
FIG. 3 is a perspective view of the magnet core according to FIG. 2 in the combined condition of all the components.

After formation of the stack, the two end faces of the sheet stack 8 are respectively connected to pole jaws 12,13, which ensure the necessary stability of the magnetic core and serve as carriers for a winding body 14 (FIGS. 2 and 3). The relative alignment of the pole jaws 12,13 to the sheet stack 8 is appropriately carried out in that the pole jaws 12,13 are provided with holes 15, and are thrust with these on the ends of the rods 9 projecting out of the sheet stack 8, and then accommodate these ends in themselves. Although the pole jaws can also consist of iron, they are preferably made from aluminium in order to reduce weight.

The winding body 14 substantially consists of a frame made from insulating material, e.g. plastic, which in the embodiment surrounds a substantially cuboid cavity 16, whose dimensions of height, length and width substantially correspond to the external dimensions of the sheet stack 8 inclusive of the pole jaws 12 and 13. Moreover the winding body 14 is provided on its upper and lower end with a respective outwardly projecting surrounding assembly flange 17, so that a surrounding accommodation space 18 results for a winding 19 (FIG. 4) between the two assembly flanges 17.

For correct positioning of the winding body 14 relative to the sheet stack 8, the pole jaws 12,13 are provided on their outer end faces with guide grooves 20, which are disposed vertically to the rods 9 and to the magnet pole surface 10. Correspondingly, the winding body 14 has on two opposite sides inwardly projecting guide ribs 21, which, when the winding body 14 is set on the sheet stack 8 from above or below, enter the guide grooves 20 and then enable a displacement of the winding body 14 relative to the magnet pole surface 10 into a desired position (FIG. 3), which is appropriately established by a stop means not shown in further detail.

Figure 4:
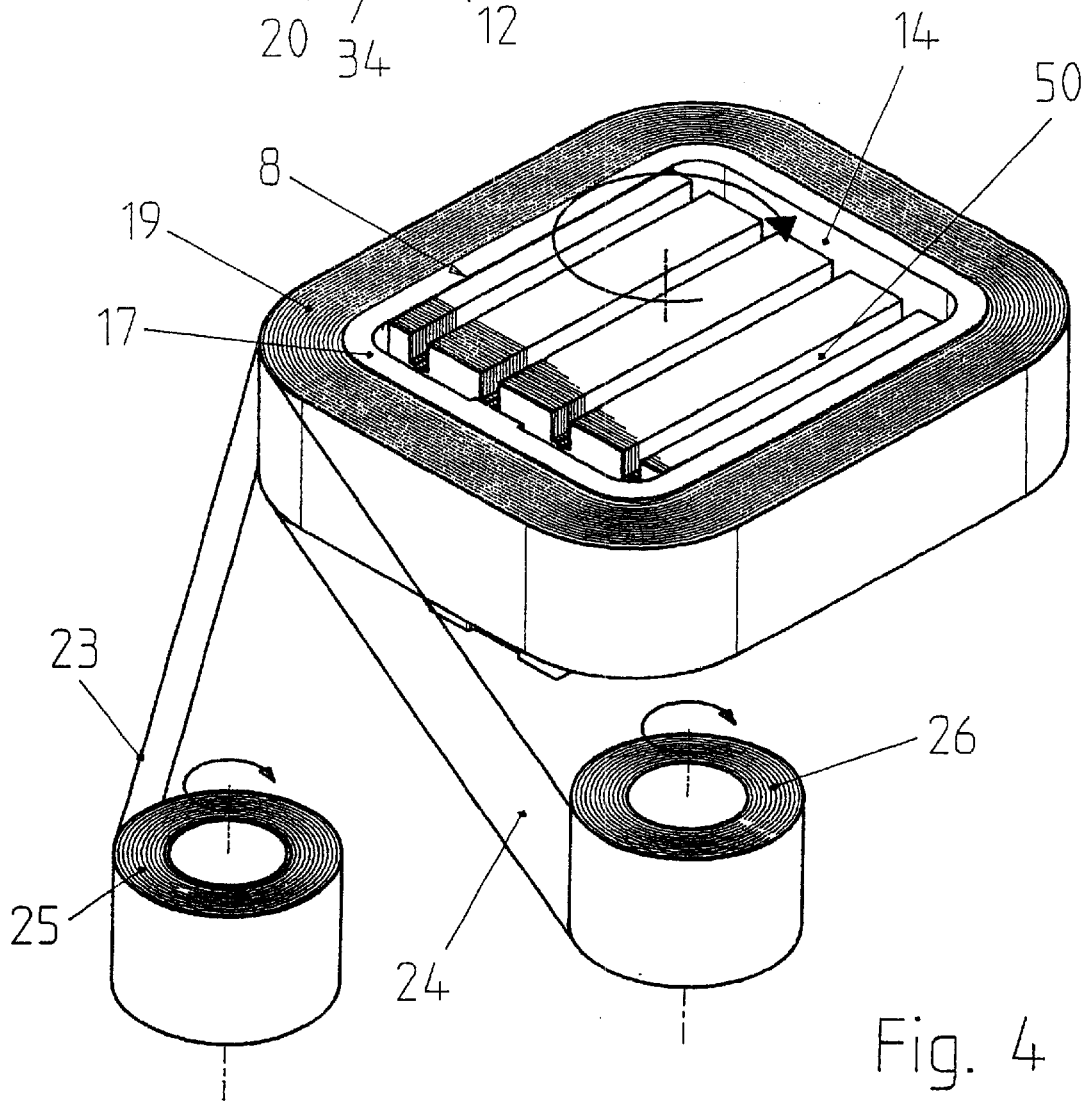
FIG. 4 is a perspective view of the winding of a winding member of the magnet core according to FIG. 3.
Figure 5:
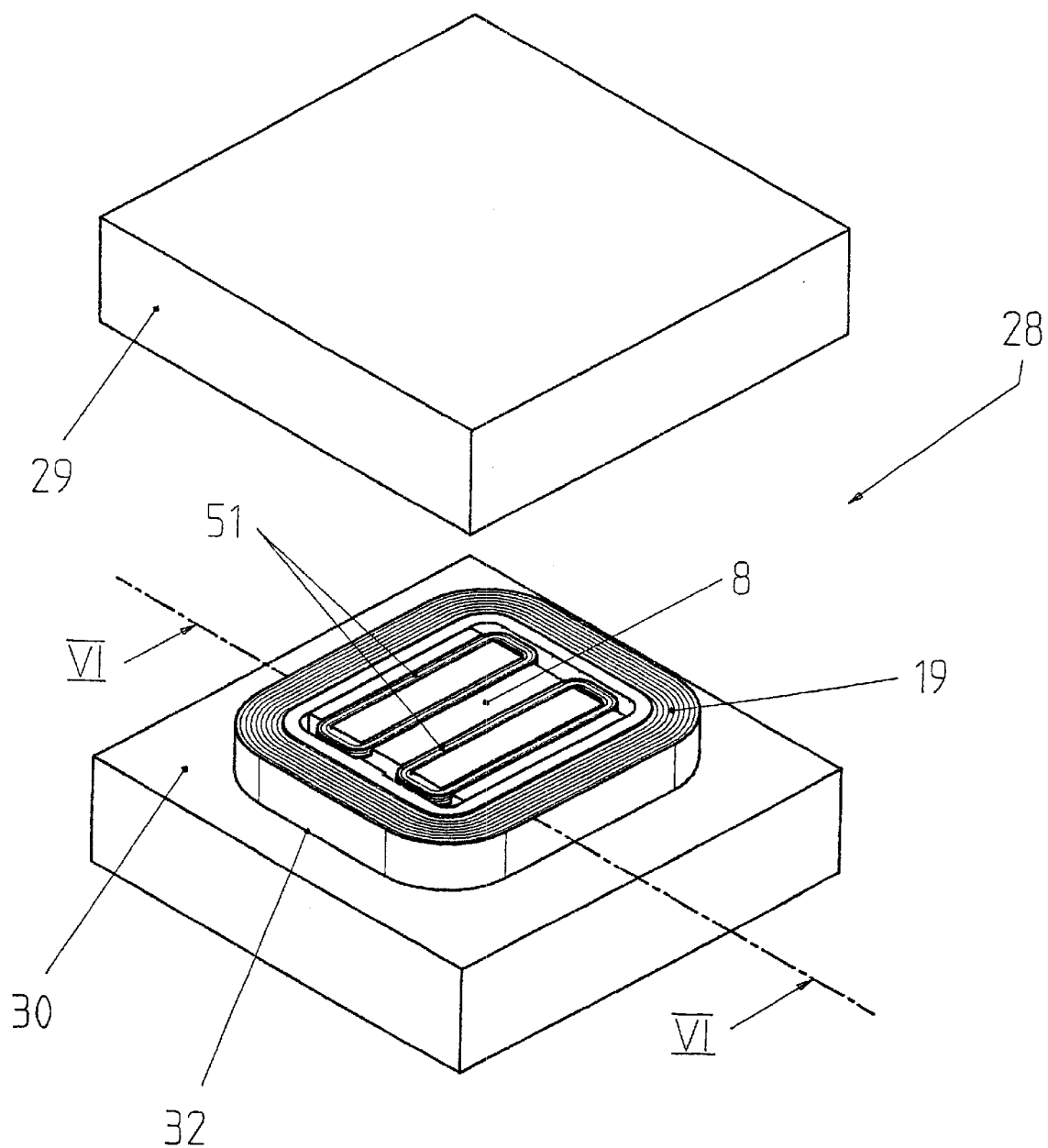
FIG. 5 is a perspective view of a magnet pole produced with the magnet core according to FIGS. 1 to 4, having a winding for a linear generator, after arrangement in one half of a tool, serving to impregnate the sheet stack, for wetting through the sheet stack and the winding, for connecting the sheet stack with the other components and for surrounding the entire magnet pole with a hardenable mixture.

As is in particular seen from FIG. 4, the winding body 14, after its positioning on the sheet stack 8, is provided with the winding 19, which is formed from alternatively succeeding layers of a conductor 23 and of an insulator 24, and comes to lie between the assembly flanges 17. The conductor 23 consists for example of an endless aluminium strip unwound from a supply coil 25, while the insulator 24 for example is a strip of a conventional insulating film unwound from a supply coil 26. Unwinding of the conductor 23 and of the insulator 24 from the supply coils 25,26, or their winding onto the winding body 14, is effected in a known way in the direction of the arrows entered in FIG. 4. Naturally it would also be alternatively possible to apply the winding 22 onto the winding body 14 before the latter is mounted on the sheet stack 8, or the winding, here shown as a layer winding, can be subdivided into a plurality of panels to be connected together.

In the assembly described in FIGS. 1 to 3 of a magnet core, the individual plates 1 loosely threaded onto the rods 9, are held in position only by the rods 9 and the winding body 14, the winding body 14 abutting on the lateral edges 5,6 of the sheets 1 and on the forward or rear sides of the pole jaws 12,13. In contrast, the winding 19 is held in position on the magnet core by the assembly flange 17. Thus the sheets 1 are simultaneously pressed against one another via the pole jaws 12,13 with a pre-selected pressure, so that they abut closely on one another. In order to connect all these parts securely, the assembly substantially visible from FIG. 4 is inserted into a mould or a shaping tool 28 (FIGS. 5 to 7); in the embodiment what is involved is a tool 28 with two tool halves 29 and 30, which are provided similarly to an injection moulding tool on opposite sides with apertures 31,32, which in the closed condition of the tool 28 (FIG. 7) form a cavity or hollow mold space, whose dimensions are only slightly larger than the outer dimensions of the finished wound magnet pole.

Figure 6:
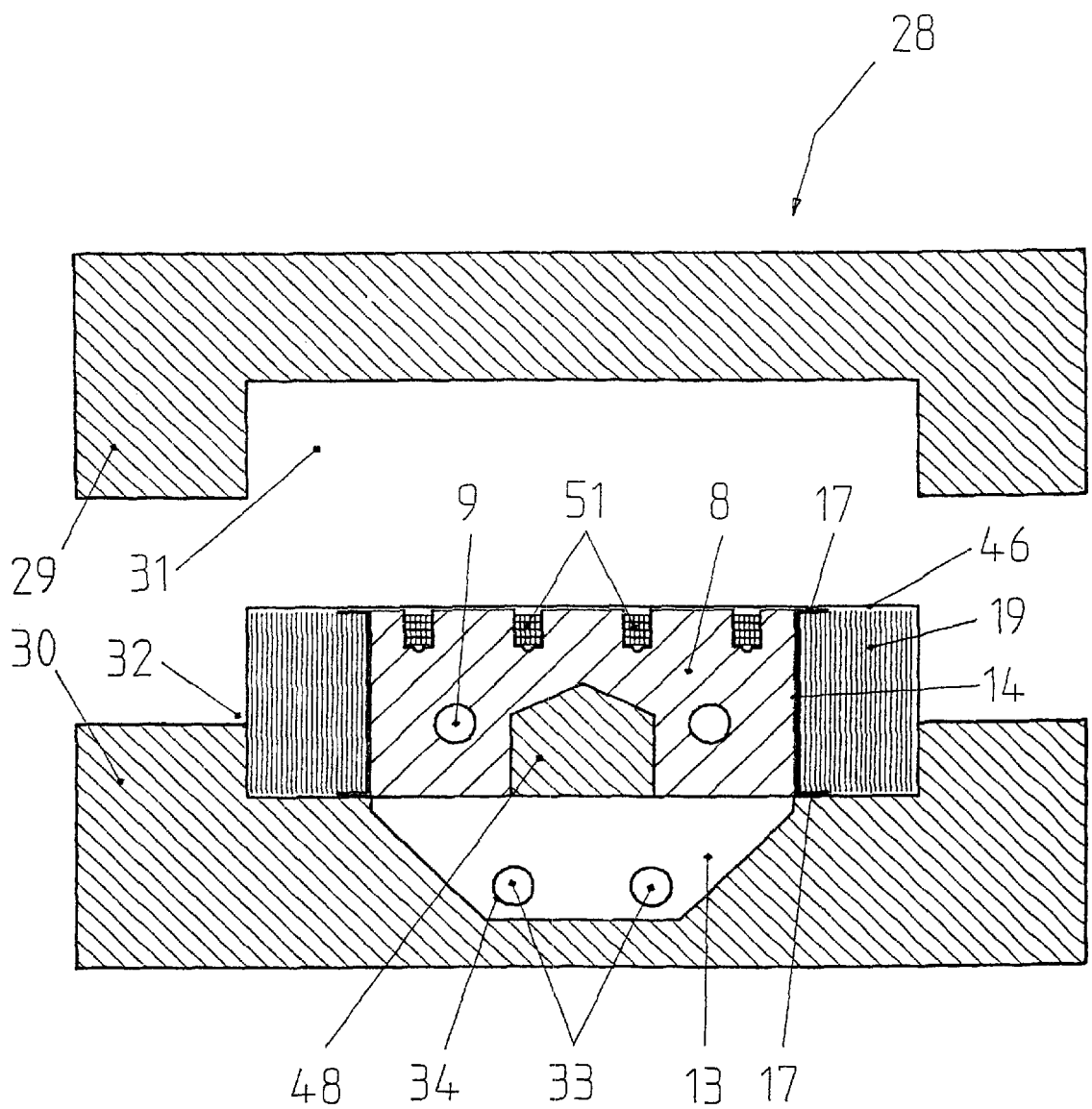
FIG. 6 is a cross-section through the tool along the line VI—VI of FIG. 5 with the magnet pole inserted.

For correct positioning of the magnet pole in the cavity, there serve on the one hand for example the lower assembly flanges 17, and on the other hand if required additional positioning means 33. In the embodiment these consist of rods, which project into holes 34 (FIG. 2), which are formed in the pole jaws 12,13 additionally to the holes 16 and at points which remain accessible beneath the winding body 14 in the assembled condition, as in particular FIG. 6 shows. The positioning means 33 are for example mounted in the side jaws of the tool half 30 and upon closing of the tool 28 are moved automatically into the holes 34. Further positioning means not shown may be disposed in the base of the tool half 30. In this way it is possible to align the sheet stack 8 and the winding body 14 relative to one another in the tool.

One of the tool halves 29,30 is provided according to FIG. 7 with an inlet opening extending as far as the cavity, to which is connected the outlet of a line 37 provided with a control valve 6, and which in addition has two inlets 40 and 41 each connected to a metering pump 38 and 39. Preceding the metering pumps 38,39 in each case is a respective mixing container 42,43 and following them is a mixer 44 incorporated in the line 37. These devices serve the purpose of preparing a hardenable mixture, in particular a casting resin mixture, and after closing the tool 28, of introducing it into the cavity. In this way, in one single working step, a plurality of objects are achieved. On the one hand the loosely stacked sheets 1 of the sheet stack 8, by means of insertion of the mixture, are provided with the adhesive layers necessary between them, and simultaneously with the use of an adhesive, they are connected together to form a solid packet. On the other hand this packet is connected with the assembly 45 forming with the other components the finished magnet pole (FIG. 8), to form a solid constructive unit, which simultaneously is covered as an entire unit and in particular at the cut edge of the sheets 1, with an anti-corrosion layer, which is indicated schematically in FIG. 6 by a line 46. The pre-selectable thickness of this layer substantially depends on the spacing between the various components of the assembly after insertion into the tool from one another, and from the wall portions defining the cavity, and can for example come to up to 10 mm, preferably 2 to 3 mm. Moreover, the assembly 45, due to the complete coverage with the hardenable mixture, receives its final mechanical electromagnetic and geometric properties, the special design of the tool 28 depending on the individual case, and the apertures 31,32 forming the mold hollow, contributing to this.

The mixture to be used is preferably a hardenable (durpolastic) casting resin mix on a basis of epoxy or polycyloolefine and consists for example of two components, namely for example a casting resin prepared in the mixing container 42 and if necessary provided with an additive, e.g. an epoxy resin or an epoxy resin mixture, and a hardener prepared in the mixing container 43, e.g. an epoxy hardener. The two components are metered in a pre-selected ratio by means of the metering pumps 38,39, introduced into the mixer 44, intimately mixed together therein and then from that point introduced via the line 37 and the control valve 36 into the cavity. Thus supply of the casting resin mixture is effected at a pressure of e.g. 1–3 bar, in order in particular to wet through or impregnate the sheet stack 8 in such a way that all the plates are covered on all sides by a thin casting resin layer.

After the cavity is filled, the casting resin mixture, preferably with heating of the entire tool 28, is left to harden, until removal from the mold can take place and the finished assembly 45 can be removed from the tool 28. Alternatively, the tool 28 may also be heated before introduction of the casting resin mass. Moreover, it is best only to harden the casting resin mass in the tool 28 and then to subject the finished assemblies 45 to a heat treatment, in order for example to terminate the hardening procedure and/or to expel slowly-evaporating components. In addition, a cleaning stage could be added.

In an embodiment of the invention felt to be best until now, the casting resin mixture is introduced after the pressure-gelating procedure into the cavities between the plates 1 and the other components of the assembly 45, or between these and the walls of the mold hollow. The pressure-gelating process is particularly advantageous, as the shrinkage occurring during hardening is compensated for in this way. In this method, which is also termed a reaction resin injection molding (e.g. Kunststoff-Lexikon, Hrg. Dr.-Ing. K. Stoeckhart and Prof. Dr.-Ing. W. Woebcken, Carl Hanser Verlag, München, BRD, 8th edition, 1992), both reaction resin masses with a long pot time and also highly-reactive resin masses can be used, which are automatically mixed and metered with the aid of the mix container 42,43 only briefly before injection into the tool 28, in an automatic manner. Thus the two inlets 40,41 shown in FIG. 7 can also open into a pressure container, from which the prepared reaction resin mixture is then expressed into the line 37 by means of compressed air.

Numerous mixtures, particularly those which are thermally hardenable, are suitable for producing the assembly 45.

Preferred hardenable mixtures are epoxy resin/hardener mixtures and mixtures of a tensioned cycloolefine and a catalyst for the ring-opening metathesis polymerization.

Suitable as epoxy resins, which can be used according to the invention are all types of epoxy resins, such as those which contain groups of the formula

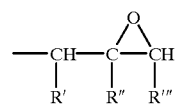

directly bonded to oxygen, nitrogen or sulphur atoms, in which either R' and R''' each contain one hydrogen atom, in which case R'' means a hydrogen atom or a methyl group, or R' and R''' together represent $-CH_2CH_2$ of $-CH_2CH_2CH_2-$, in which case R'' means a hydrogen atom.

As examples of such resins there should be mentioned polyglycidylesters and poly(β-methylglycidyl)esters, which can be obtained by conversion of a compound containing two or more carboxylic acid groups per molecule with epichloryhdrin, glycerine dichlorhydrin or β-methylepichloryhdrin in the presence of alkali. Such polyglycidyl esters can be derived from aliphatic polycarboxylic acids, e.g. oxalic acid, succinic acid, glutaric acid, adipic acid, pimelic acid, suberic acid, azelaic acid, sebacic acid or dimerized or trimerized linolaic acid, from a cycloaliphatic polycarboxylic acids such as tetrahydrophthalic acid, 4-methyltetrahydrophthalic acid, hexahydrophthalic acid and 4-methylhexahydrophthalic acid, and from aromatic polycarboxylic acids, such as phthalic acid, isophthalic acid and terephthalic acid.

Further examples are polyglycidyl ethers and poly(β-methylglycidyl) ethers, which are obtainable by conversion of a compound containing at least two free alcoholic and/or phenolic hydroxyl groups per molecule with the corresponding epichlorhydrin under alkaline conditions, or also in the presence of an acidic catalyst with subsequent alkali treatment.

These ethers can be produced with poly-(epichlorhydrin) from acyclic alcohols, such as ethylene glycol, diethylene glycol and higher poly-(oxyethylene)-glycols, propane-1,2-diol und poly-(oxypropylene)-glycols, propane-1,3-diol, butane-1,4-diol, poly-(oxytetramethylene)-glycols, pentane-1,5-diol, hexane-1,6-diol, hexane-2,4,6-triol, glycerine, 1,1,1-trimethylolpropane, pentaerythrite und sorbite, from cycloaliphatic alcohols, such as resorcite, chinite, bis-(4-hydroxycyclohexyl)-methane, 2,2-bis-(4-hydroxycyclohexyl)propane and 1,1-bis-(hydroxymethyl)-cyclohexene-3, and from alcohols with aromatic cores, such as N,N-bis-(2-hydroxyethyl)-aniline and p,p'-bis-(2-hydroxyethylamino)-diphenylmethane. They can also be produced from single-core phenols, such as resorcin und hydroquinone, and multicore phenols such as bis-(4-hydroxyphenyl)-methane, 4,4-dihydroxydiphenyl, bis-(4hydroxyphenyl)-sulfone, 1,1,2,2-tetrakis-(4hydroxyphenyl)ethane, 2,2-bis-(4-hydroxyphenyl) propane (bisphenol A) and 2,2-bis-(3,5-dibromo-4hydroxyphenyl)-propane Further suitable hydroxy compounds for producing polyglycidyl ethers and poly(β-methylglycidyl) ethers, are the novolacks obtainable by condensation of aldeyhdes, such as formaldehyde, acetaldehyde, chloral and furfural and phenoline, for example phenol, o-cresol, m-cresol, p-cresol, 3,5-dimethylphenol, 4-chlorphenol and 4-tert.-butylphenol.

Poly-(N-glycidyl)-compounds can be obtained for example by dehydrochlorination of the conversion products of epichloryhdrin with at least two amines containing amino hydrogen atoms, such as aniline, n-butylamine, bis-(4-aminophenyl methane, and bis-(4-methylaminophenyl)-methane. Further suitable poly-(n-glycidyl)compounds are triglycidylisocyanurate and n,n'-diglycidyl derivates of cyclic alkylene ureas, such as ethylene-urea and 1,3-propylene-urea, and hydantoines, for example 5,5-dimethylhydantoine.

Poly-(S-glycidyl)-compounds are for example the Di-S-glycidyl derivates of dithiolene, such as ethane-1,2-dithiol and Bis-(4-mercaptomethylphenyl)-ether.

Examples for epoxy resins with groups of the formula

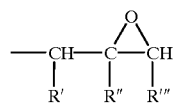

wherein R' and R" together mean a —CH$_2$CH$_2$— or a —CH2-CH2-CH2-CH2-group, are bis-(2,3-epoxycyclopentyl)-ether, 2,3-epoxycyclopentylglycidylether, 1,2-bis-(2,3-epoxycyclopentyloxy)-ethane and 3',4'-epoxycyclohexylrnethyl-3',4'-epoxycyclohexane-carboxylate.

Also considered are epoxy resins, in which the glycidyl groups or β-methylglycidyl groups are bonded to heteroatoms of various types, e.g. the N,N,O-triglycidyl derivate of 4-aminophenol, the glycidylether/glycidylester of salicylic acid or p-hydroxybenzoic acid, N-glycidyl-N'-(2-glycidyloxypropyl)-5,5dimethylhydantoine and 2-glycidyloxy-1,3-bis-(5,5-dimethyl-1-glycidylhydantoinyl-3)-propane.

If required, epoxy resin mixtures can be used.

Preferably, diglycidylethers of bisphenols are used. Examples of this are bisphenol A-diglycidyl ether, bisphenol F-diglycidyl ether and bisphenol S-diglycidyl ether. Bisphenol A-diglycidyl ether is particularly preferred.

Quite particularly preferred are liquid and low-viscosity epoxy resins. Appropriately the viscosity at 25° C. does not exceed a value of 20'000 mPas.

In a method according to the invention, all the known epoxy resin hardeners can in theory be used.

Preferably a carboxylic acid or a carboxylic acid anhydride is used as an epoxy hardener.

Suitable carboxylic acids include aliphatic dicarboxylic acids, such as oxalic acid, malic acid, succinic acid, glutaric acid, adipic acid, pimelic acid, suberic acid, azelaic acid, sebacic acid, 3,6,9-trioxaundecandic acid, or dimerized or trimerized linoleic acid; cycloaliphatic polycarboxylic acids, such for example as tetrahydrophthalic acid, 4-methyltetrahydrophthalic acid, hexahydrophthalic acid and 4-methylhexahydrophthalic acid; aromatic dicarboxylic acids, such as phthalic acid, isophthalic acid, terephthalic acid or naphthalic acid; or diester-dicarbooxylic acids, which are obtainable for example by conversion of glycols, e.g. polypropylene glycol with two equivalents dicarboxylic acid anhydride, e.g. tetrahydrophthalic acid anhydride.

There can be considered in theory as anhydride hardeners all anhydrides of di- and higher-functional carboxylic acids, such as linear aliphatic polymeric anhydrides and cyclic carboxylic acid anhydrides.

Suitable acid anhydrides includes polysebacic acid polyanhydride, polyazelaic acid polyanhydride, succinic acid anhydride, citraconic acid anhydride, itaconic acid anhydride, alkenyl-substituted succinic acid anhydride, dodecenylsuccinic acid anhydride, maleic acid anhydride, tricarballylic acid anhydride, nadican hydride, methylnadican hydride, linoleic acid adduct on maleic acid anhydride, alkylised endoalkylene tetrahydrophthalic acid anhydride, methyltetrahydrophthalic acid anhydride, tetrahydrophthalic acid anhydride, hexahydrophthalic acid anhydride, pyromellitic acid dianhydride, trimellitic acid anhydride, phthalic acid anhydride, tetrachlorophthalic acid anhydride, tetrabromophthalic acid anhydride, dichloromaleic acid anhydride, chloronadic anhydride and chlorenedicanhydride.

Preferably liquid or easily-melting dicarboxylic acid anhydrides are used as epoxy resin hardeners.

Particularly preferred anhydride hardeners are methylnadicanhydride, tetrahydrophthalic acid anhydride and methyltetrahydrophthalic acid anhydride, methylnadicanhydride and methyltetrahydrophthalic acid anhydride being preferably used as an isomer mixture.

If required the anhydride hardener can be used in combination with a reaction accelerator conventional for anhydride hardeners. There are suitable for example as reaction accelerators tertiary amines, carboxylic acid salts, metal chelates or organophosphenes. Preferred accelerators are the tertiary amines, for example N,N-dimethylbenzalamine, or substituted imidazoles.

A particular advantage of the method described for manufacturing the assembly 45 resides in the fact that the process steps of impregnation of the loosely layered sheet stack 8, surrounding of the other components and of the entire assembly 45 with an anti-corrosion layer 46 (FIG. 6) and the secure connection of all parts together can be effected in one single working step, without the necessity for additional mechanical connecting means. Thus the procedures of loading and unloading the tool 28, opening and closing the tool 28 and filling of the remaining cavities within the hollow mold may be to a large extent automated.

If in addition hardenable mixtures with electrically insulating properties are used, which applies to the abovenamed materials, then there results the further advantage that the sheets 1 are surrounded in the single named working step with an electrically insulating layer, so that in theory also entirely untreated magnetic steel sheets having no insulating layers, can be used as initial materials.

A further outstanding advantage of the invention in this case resides in the fact that the individual sheets 1 of the sheet stack 8 can be inserted in an in fact totally untreated but however stacked and densely packed condition into the tool 28. Due to the natural surface roughness in the area of their wide sides 7, there remain between the sheets 1, even in the stacked, densely packed condition a sufficiently large number and size of cavities, which fill with this mixture upon its penetration into the tool 28, which then, in the hardened condition, provides the necessary insulation between the individual sheets 1 without the formation of disruptive bubbles of the like. This effect can be further improved and optimized in that, before or during injection of the mixture, the cavity is at least partly evacuated, in order to produce a slight reduction in pressure of e.g. 2 to 10 millibars, if necessary to be determined by tests, and thus to suction the mixture additionally into the cavity, so that simultaneously the necessity is removed of expelling the air still located in the cavity with the aid of the mixture.

Finally a further advantage is that the external shape of the assembly 45 can be selected substantially independently of the shape of the individual sheets 1 produced by stamping, and of the winding 19 laid around it. In particular, by means of corresponding formation of the mold hollow, it can be assured that the external anti-corrosion layer is sufficiently thick and environmentally resistant, whilst simultaneously by means of the stacking of the sheets 1 and the pressure used to clamp them, the required thin adhesive and if necessary insulating layers can be produced between the individual sheets 1.

The embodiment according to FIGS. 1 to 8 may be modified and/or supplemented in many ways. If for example the assemblies 45 serve the purpose of producing a heteropolar inductor for the magnetic levitation vehicle (DE 34 10 119 A1), then, in order to reduce weight, the individual sheets 1 can be provided in a central lower area with a respective aperture 47 (FIG. 1), as this section is not required for magnetic purposes. During the casting procedure, a core 48 (FIG. 6) can be laid into the groove thus resulting in the stacked sheet stack 8, so that the groove is not filled with mixture and yet the walls defining it are provided with a thin anti-corrosion layer. It is further possible to provide the sheets 1 at their upper sides 3 during stamping with apertures 49 (FIG. 1) which in the stacked condition form grooves 50 (FIG. 2), which abut on the magnet pole surface 10 and can be inserted into the additional windings 51 according to FIGS. 5 and 6, which form a linear generator known per se during operation of the magnetic levitation vehicle. These windings 51 also form a constructive element which is securely connected to the remaining assembly 45 by means of the penetration of the casting compound, and if necessary is provided with an additional protective layer.

Finally, the undersides 4 (FIG. 1) of the sheets 1 of the entire sheet stack and/or the undersides of the pole jaws 12,13 can be kept free of mixture. For this purpose for example the cavity of the tool 28 is so designed that the undersides, after location of the various components in the tool 28, abut directly on corresponding wall portions. As the undersides of the sheet stacks and/or of the pole jaws 12,13 in a complete magnet, usually consisting of a plurality of such magnet poles, are magnetically connected together by means of ferromagnetic pole backs located beneath the windings 19, it is ensured in this way that in the boundary surfaces between the magnet poles and the magnet back no magnetically disruptive slots formed by included mixture arise.

Figure 9:
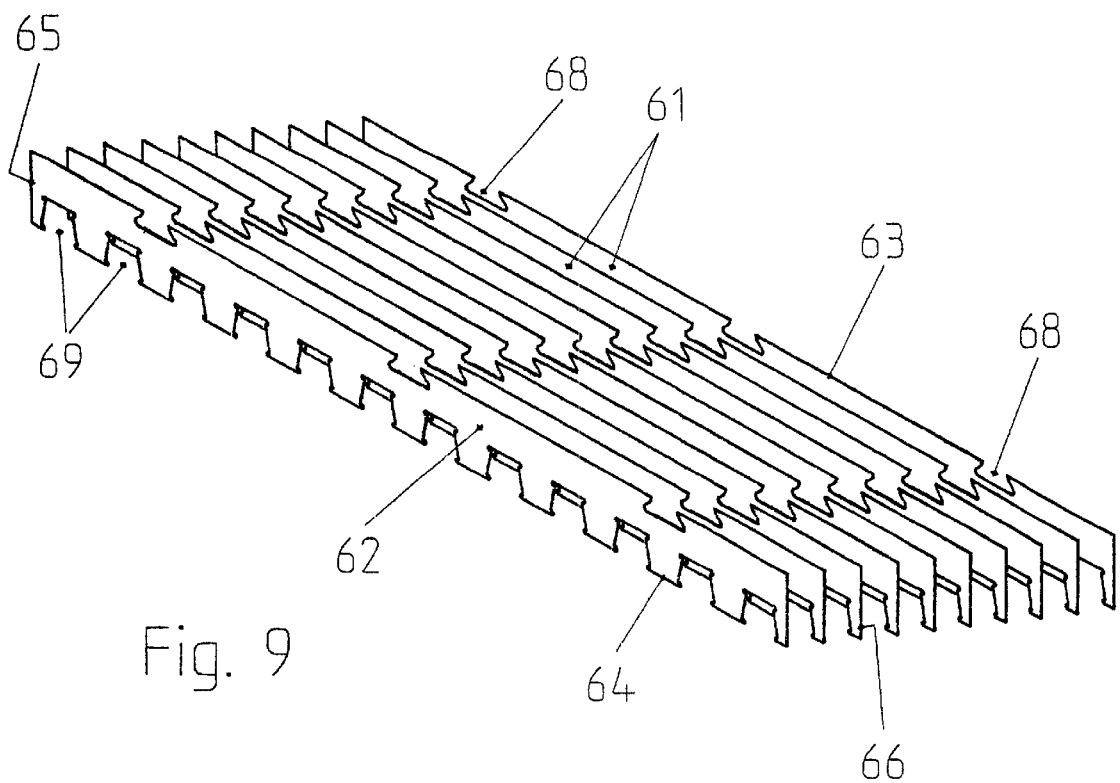
FIG. 9 is a view corresponding to FIG. 1 of some sheets of the stator sheet stack according to the invention.
Figure 10:
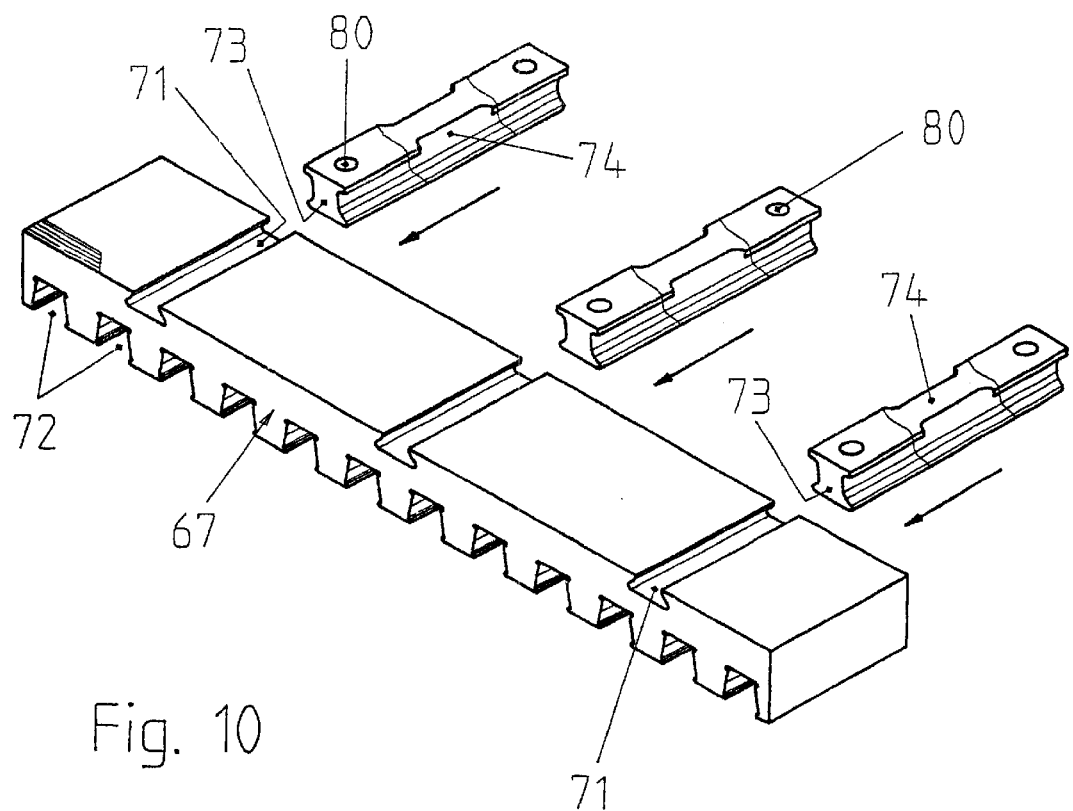
FIGS. 10 and 11 are perspective views of the stator sheet stack according to FIG. 9 in the stacked condition before or after application of a number of crosspieces.
Figure 11:
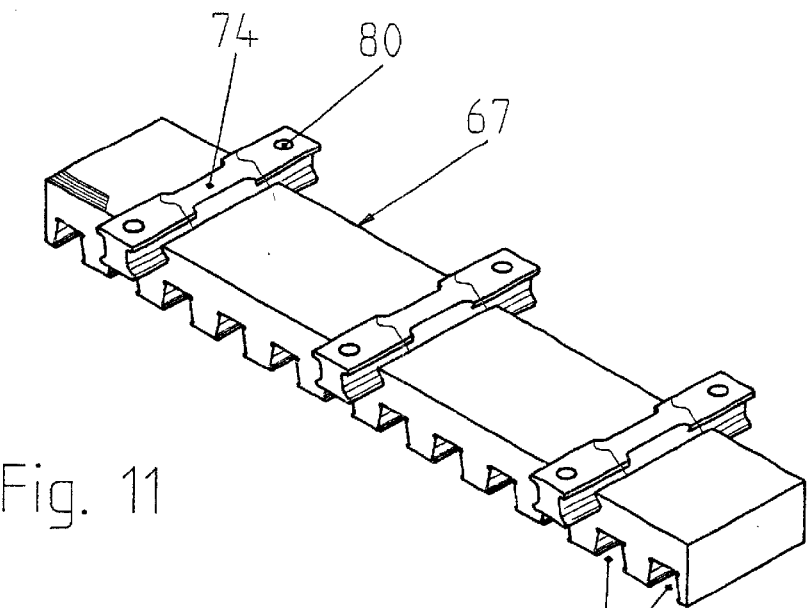

FIGS. 9 to 15 illustrate the manufacture of a stator packet for the long stator linear motor of a magnetic levitation vehicle. Similarly to FIGS. 1 to 8, the stator packet contains a plurality of sheets or lamellae 61, of which only a few are shown in FIG. 9 and which are obtained by stamping from a raw ferromagnetic sheet metal strip comprising no adhesive layer. In the embodiment, the sheets 61 have identical dimensions and each have a forward and rear wide side 62 and respectively in the circumferential direction a narrow upper side 63, underside 64 and two side edges 65 and 66. By means of auxiliary means not shown in further detail, the sheets 61 are stacked into sheet stacks 67 (FIG. 10), being applied against one another with their forward or rear wide side 62, and being aligned flush with one another. The number of sheets 61 used in this case depends on the required electrical and magnetic properties for the long stator linear motor.

During the manufacture by stamping, the sheets 61 are provided on their upper sides 63 with apertures 68 and on their undersides 64 with apertures 69. After stacking of the sheets 61 to form the sheet stack 67 (FIG. 10), the apertures 68 respectively form grooves 71 and the apertures 69 respective grooves 72. The apertures 68 open towards the upper side 63, and grooves 70, have for example a dovetail cross-section and serve to receive correspondingly shaped foot sections 73, which are integrally formed on straight crosspieces 74 substantially in a double-T shape in cross-section. In contrast, the apertures 69 open towards the undersides 64 and grooves 72, have substantially rectangular or square cross-sections. After formation of the stack, the foot sections 73 of the crosspieces 74 are inserted in the direction of the arrows shown in FIG. 10 into the grooves 71 of the sheet stack 67, and are centered therein, so that the loosely initially-mounted assembly visible in FIG. 11 results. Alternatively, the sheets 61 may of course also be individually threaded onto the correspondingly positioned crosspieces 74.

The finally mounted assembly, similar to the assemblies according to FIG. 4, is now inserted into a tool 75, (FIGS. 12 to 14) which in the embodiment has two tool halves 76,77, which are provided at opposite sides with apertures 78,79, which in the closed condition of the tool 75 form a mold hollow or cavity, whose dimensions are slightly larger than the external dimensions of the inserted assembly.

The crosspieces 74 are provided at their ends which project slightly beyond the sheet stack 67, with bores 80 intended to accommodate attachment screws. In order that these remain free during filling of the cavity with hardenable mixture, the tools 76,77, at the points where the bores 80 come into contact, are provided with holes 81, into which locking pistons 82 may be introduced. These are secured at the end of the piston rods 83 of a respective pneumatic or hydraulic cylinder 84 attached to the associated tool half 76,77, and which is shown in the left-hand part of FIG. 13 in the retracted condition, and in the right-hand part of FIG. 13 in the extended condition. In the extended condition the locking bolt 82 for example is applied against the underside of the crosspiece 74 and against a lateral section surrounding the associated bore 80, so that one end of the bore 80 is closed. Simultaneously, the locking piston 82 presses the crosspiece 74 securely against the opposed wall section of the associated tool half, which in this way closes the other end of the bore 80, so that no mixture can penetrate. If required, a closure stopper 85 passing into the bore 80, can be applied to the locking pistons 82 and/or the opposed wall.

The pistons 82 in addition bring about positioning of the crosspieces 74 relative to the tool 75. If required additional positioning means not shown in further detail, can be provided for example on the base of the tool 75, and which position the sheet stack 67 relative to the tool 75 and relative to the crosspieces 74. Finally, if necessary, means corresponding to the cylinder 84 or other means can be provided, which act for example through side walls of the tool 75 on the sheet stack 67, in order to press its sheets 61 closely against one another.

Figure 13:
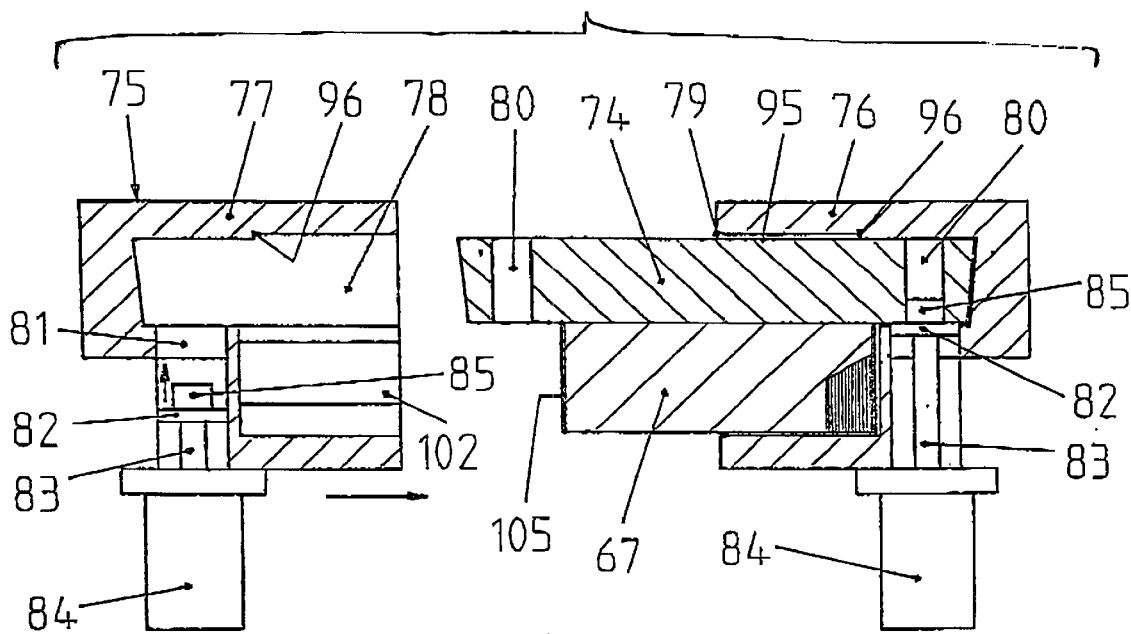
FIG. 13 is a cross-section through the mould along the line XIII—XIII of FIG. 12.
Figure 14:
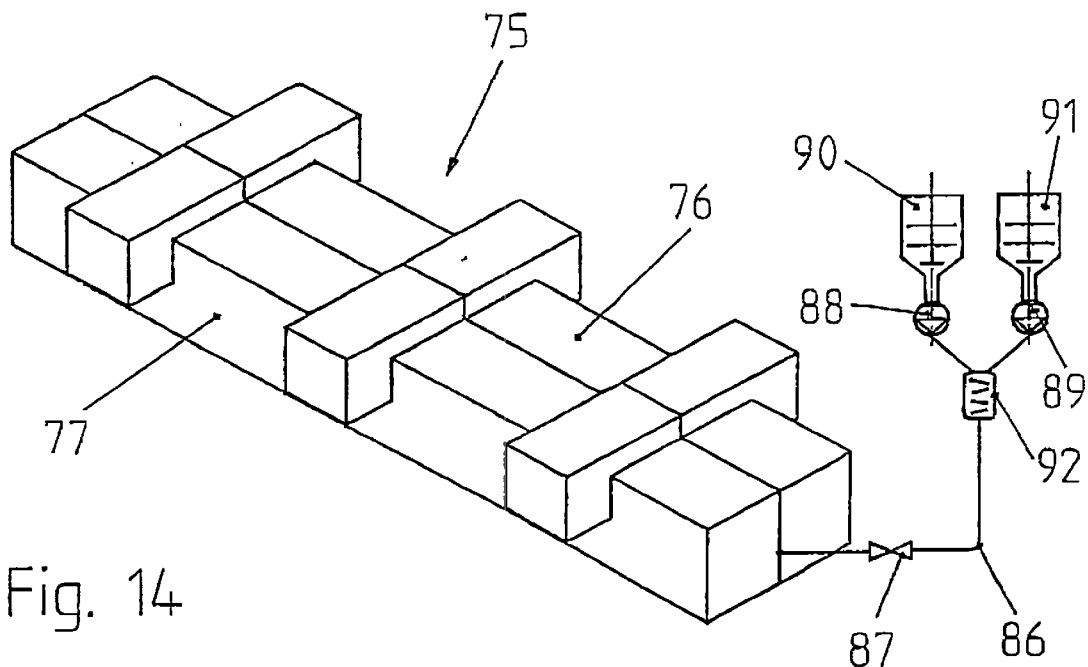
FIG. 14 is a schematic view according to FIG. 7 of the insertion of the hardenable mix into the tool according to FIGS. 12 and 13.

After the tool 75 is closed in the direction of the arrow shown in FIG. 13, and after extension of the piston rods 83 into the position shown in the right-hand part of FIG. 13, a mixture is introduced into the cavity, for which purpose the tool 75, similarly to FIG. 7, is provided with an inlet opening extending as far as the cavity, and which is connected by means of a line 86 (FIG. 4) to a control valve 87 and via metering pumps 88,89 to mixing containers 90,91, which contain a reaction resin or a hardener or the like, in order to prepare the mixture therefrom. The reaction resin and hardener components are metered with the metering pumps 88,89 are mixed in a mixer 92. The process steps of introduction of the mixture into the cavity, of hardening or hardening out of the mixture, of heating and if necessary of cleaning, are similar to the embodiment according to FIGS. 1 to 8 and therefore need not be described again. The same applies to the mixtures to be used, particularly casting resin mixture, whose preparation, the preferred injection of the mixture at a pressure of e.g. 1 to 3 bar, the preferable additional evacuation of the cavity and the preferred application of the pressure-gelling method.

Figure 15:
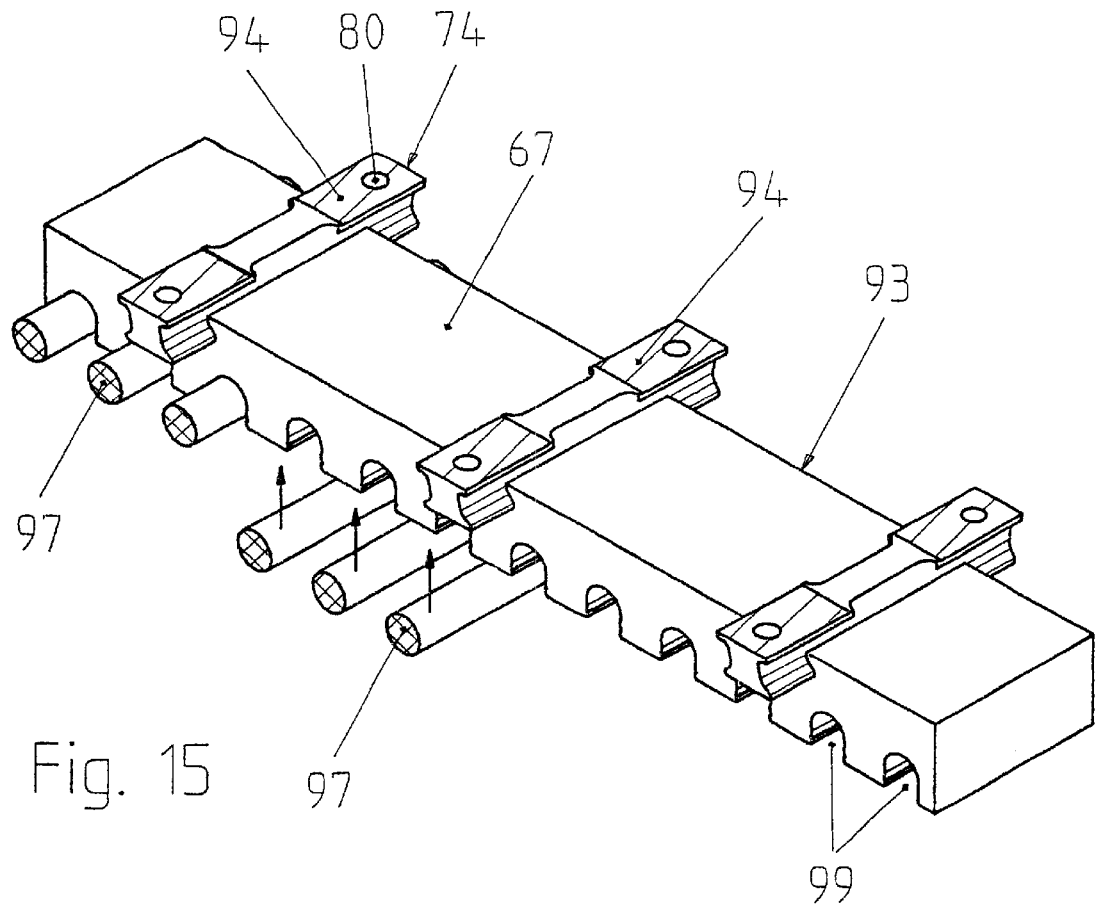
FIG. 15 is a perspective view of the finished stator packet.

After removal from the mold, the finished assembly 93 visible in FIG. 15 is obtained in the form of a stator packet.

As with the manufacture of the assembly 45, there results in the embodiment according to FIGS. 9 to 15 the advantage that the impregnation of the loosely layered sheet stack 67 consisting of not particularly pre-treated sheets 61, the surrounding of the remaining components and of the entire stator packet with an anti-corrosion layer, and the secure connection of all parts together can be effected in one single process step, and the procedures necessary therefore can to a large extent be automated. Finally also, the external shape of the finished assembly 93 can be selected largely independently of the stamped shape of the individual sheets 61, as will be explained with reference to some possible variants.

The assembly 93 is secured in a known way (DE 39 28 277 C1) with the aid of the bore 80 and attachment screws introduced therein to connecting members of the track support of a magnetic levitation track. Thus surface sections 94, shown cross-hatched in FIG. 15, located on the upper side of the crosspieces 74, and surrounding the ends of the bores, serve as stop or reference surfaces which establish the precise position of the crosspieces 74 and thus of the entire assembly 93 relative to the track support. These surface sections 94 are preferably not covered by an insulating or anti-corrosion layer, in order to avoid inaccuracies in positioning, rotation or settling of this layer during tightening of the attachment screws and if necessary loosening of the attachment screws caused thereby during later operation of the magnetic levitation track. For this purpose, the locking pistons 82 press the surface sections 94 cross-hatched in FIG. 15 in such a way against a correspondingly formed wall of the tool 75, that no mixture can settle there, while at the other point of the overall assembly 93 a small intermediate space 95 (FIG. 13) always remains between it and the walls of the tool 75, which enables the formation of an external layer of the mixture, particularly serving as an anti-corrosion means. This is most simply achieved by corresponding steps 96 in the walls forming the cavity.

Figure 16:
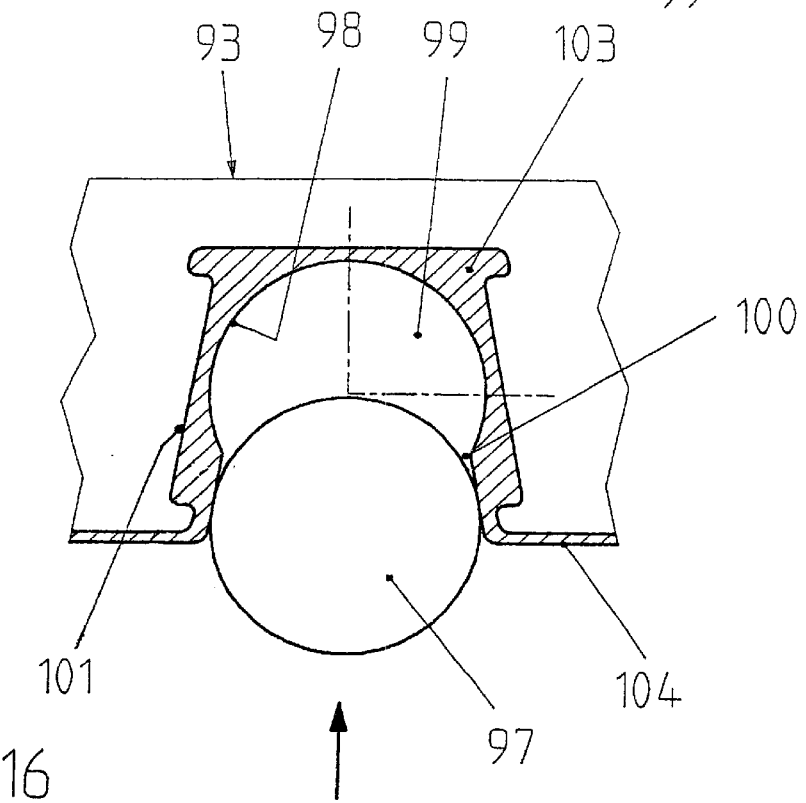
FIG. 16 is a detailed cross-sectional view through an individual groove of the stator packet according to FIG. 15.

The lower grooves 72 of the sheet stack 67 serve in a likewise known way to accommodate the skeins of a three-phase AC winding (DE 31 10 339 C2, DE 33 02 961 C2), substantially consisting of electrical conductors 97 (FIGS. 15 and 16). In order to simplify the assembly and position-fixing of the conductors 97, walls 98 of the corresponding grooves 99 in the finished assembly 93 appropriately have a shape which enables the conductors 97 to be pressed with slight elastic deformation in the direction of the arrows entered into the grooves 99 and thus to fix them without further auxiliary means after the fashion of a snap-in connection in the assembly 93. For this purpose the walls 98 are appropriately opened downwards by means of slots 100, which at their narrowest point have a smaller width than that corresponding to the diameter of the conductors 97. Such a groove shape however generally does not correspond to the shape of the grooves 72 of the sheet stack 67. These grooves 72 rather have, for electrical and/or magnetic reasons, or for reasons relating to the operation of the magnetic levitation track, and in order to achieve a minimal waste during the stamping procedure, the shape visible above all from FIGS. 9 and 10, which is indicated in FIG. 16 by an additional line 101. In order to do justice to both functions, the tool 75 (FIG. 13) is appropriately provided with a plurality of cores 102 (FIG. 13), which during positioning of the sheet stack 67 in the cavity or during closure of the tool, are introduced into the individual grooves 72. The shape of these cores 102 is selected in accordance with the shape which the final grooves 99 should have, so that the walls of the grooves 72 present in the sheet stack 67, during introduction of the hardenable mixture, are provided with a comparatively thick lining 103 shown cross-hatched in FIG. 16, which in the finished condition of the assembly 93 lead to the desired shapes of the walls 98. The remaining applied anti-corrosion layer on the other hand can be kept relatively thin, as is shown for example in FIG. 16 by the reference number 104.

It also applies with respect to the finished assembly 93, that by means of introduction of the mixture in one single working step, on the one hand, the sheets 61 are provided with the layers serving for mutual interconnection, and are connected together forming a finished sheet stack 67, while on the other hand the sheet stack 67 together with further components (crosspieces 74) is connected to form a finished assembly 93 (stator packet). Moreover, when using the method according to the invention, the final electrical, magnetic, mechanical and/or geometric properties of the sheet stacks or assemblies are at least partly obtained only by the treatment of all components with the mixture in a tool, particularly if a hardenable mixture with sufficient electrically insulating properties is used. This applies in particular with reference to the application of the insulating layers for the individual plates, the external anti-corrosion means, the permanent connection of the various parts together and the final external shape of the surrounded sheet stacks, assemblies or parts thereof, e.g. grooves 99. Of particular advantage in addition is the fact that additional connection means for example as screws, rivets, adhesives or the like are required neither for positioning nor for connecting the individual parts, and the mechanical strength and environmental resistance can be established by the thickness of the external surrounding of the mixture.

Figure 12:
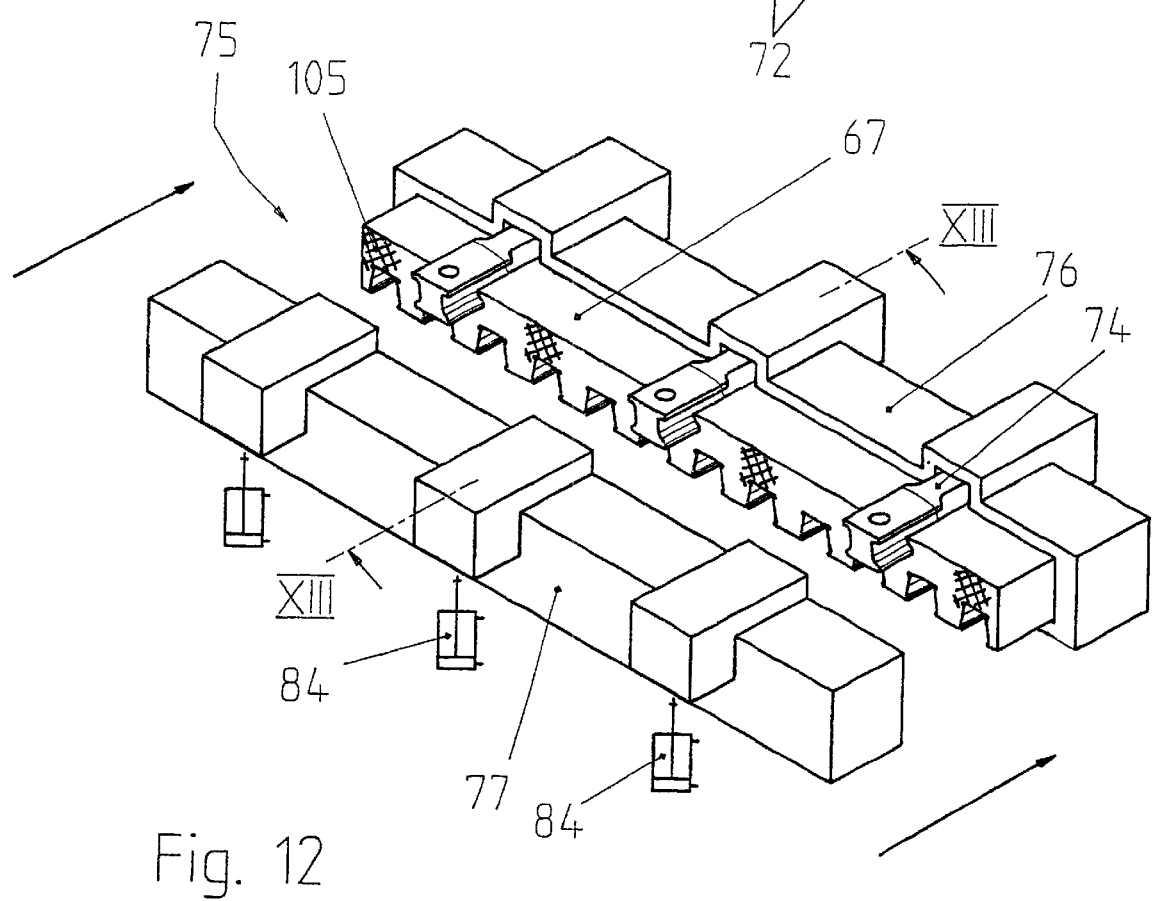
FIG. 12 is a perspective view of a stator packet formed from the stator sheet stack and the crosspieces according to FIGS. 10 and 11, after arrangement in one half of a tool, serving to impregnate the sheet stack, for wetting through the sheet stack and the crosspieces, for connecting the sheet stack to the crosspieces and for surrounding the entire stator packet with a hardenable mixture.

As shown in particular by FIG. 12, it may also be appropriate to supply the sheet stacks or assemblies inserted into the tool at specific points, e.g. on their outer sides, with a spacer member 105 consisting of a porous material, e.g. a woven mat produced from plastic fibres or the like, which holds the sheet stack 67 or the like at a desired spacing from the walls of the mold hollow. Such elements or mats are fully impregnated with the mixture during the injection procedure, so that during hardening a stable, strong plastic resin layer results, which forms a mechanically strong external wall on the finished assembly 93 and increases its mechanical strength.

In order to improve the electrical properties (dielectric constant, loss factor) there may be added to the hardenable mixtures silanes, e.g. the compounds offered by the Company Osi Specialties under the title Silquest Silane. Suitable silanes are for example octyltriethoxysilane, methyltriethoxysilane and vinyltriethoxysilane.

In addition, the hardenable mixtures can contain fillers for example metal powder, wood powder, glass powder, glass pearls or semi-metal and metal oxides. Preferred fillers are Wollastonite, $Al_2O_3$ and $SiO_2$, quartz powder of the various $SiO_2$ modifications being particularly preferred.

In addition to the additives mentioned, further additives for example anti-oxidizing agents, light-protective agents, plasticisers, pigments, dye stuffs, thixotropic agents, viscosity improvers, de-foamers, anti-static agents, lubricants and mold release agents can be contained in the hardenable mixtures.

Moreover, the hardenable mixtures may be produced according to known methods, conventionally with the aid of known mixing units (stirrers, kneaders, rollers, mills, dry mixers or thin-layer de-gassing mixers). The various methods for producing mixtures are known to the person skilled in the art and are for example described in Becker/Braun: "Kunstoff-Handbuch, vol. 10, Duroplaste", Carl Hanser Verlag 1988, pages 515 ff and 825 ff.

If it is desired to stack the individual sheets 1,61 in a way other than that explained above, they can be fixed with appropriate auxiliary means, e.g. spacers, on the ends in such a way that the spacings between the individual sheets are approximately equal. In this case it is irrelevant that the spaces between all the plates are exactly identical. There need only be sufficient room for entry of the insulating resin compound into the inter-spaces between the individual plates 1,61. The spacing between the plates 1 in this way can be adjusted for example from 1 μm to 100 μm, preferably to 2 μm to 5 μm.

The metal plates usable in the method according to the invention are preferably steel plates, although other ferromagnetic materials can also be used.

The invention is not restricted to the embodiments described, which may be varied in many ways. In particular it is self-evident that the magnet poles and stator packets described can be provided also with other components not described in detail, e.g. with electrical or mechanical connections leading outwards, which are likewise fixed and/or formed by the surrounding mixture. Finally, the invention also embraces the assemblies produced according to the method described, the individual features also being applicable in combinations other than those described and illustrated in the drawing.

What is claimed is:

1. A method of manufacturing an electromagnetic assembly in form of a stator packet of a long stator motor for a magnetic levitation train, said assembly including a sheet stack consisting of ferromagnetic material, and at least an additional component, said method comprising the steps of: providing a plurality of raw magnetic steel sheets; providing first apertures on upper sides of said sheets; providing second apertures on undersides of said sheets; stacking said sheets for providing said stack so that at least one first groove is formed in said stack by said first apertures and at least one second groove is formed in said stack by said second apertures, said second groove being intended to accommodate an elastically deformable electrical conductor and having a groove wall and a cross-section selected according to desired electromagnetic properties of said stack; inserting a cross-piece into the at least one first groove, said crosspiece sewing as an aid for mounting said electromagnetic assembly; forming said assembly from said stack and said component; positioning said assembly in a cavity defined by wall portions of a shaping tool; and then finishing said assembly by means of a pressure-gelation method, said pressure gelation method comprising the steps of providing a thermally hardenable mixture which comprises a duroplastic epoxy resin component and a hardener component; introducing said mixture into said cavity such that said mixture is introduced into cavities between said sheets so as to connect said sheets as well as surrounds said sheets, said stack and said assembly as a whole on all sides; heating said shaping tool; hardening or hardening out said mixture at least as long until removal of said assembly from said shaping tool, whereby in one single working step said sheets are connected together, said stack is connected with said at least one component, said wall of said at least one second groove is provided during introduction of said mixture into said cavity with a lining comprised of said mixture such that a mechanically effective groove results having an effective groove wall with a cross-section selected according to said conductor, said assembly is provided with final electrical, magnetic and/or mechanical properties and said assembly is completely surrounded with an anti-corrosion layer having a thickness which is selected by a spacing between said sheet stack and wall portions of said shaping tool.

2. The method according to claim 1, wherein the effective groove wall has a final cross-section selected so that the effective groove wall opens outwards by means of a slot having a narrowest point of smaller width than the corresponding to an external diameter of said conductor.

3. The method as defined in claim 1, wherein said mixture has electrical insulating properties such that a mutual electrical insulation is produced between said sheets.

* * * * *